(12) United States Patent
Sibilleau et al.

(10) Patent No.: US 12,735,145 B2
(45) Date of Patent: Sep. 15, 2026

(54) DRIVEN SHAFT BEARING HUBS FOR SNOWMOBILES

(71) Applicant: Arctic Cat Inc., Thief River Falls, MN (US)

(72) Inventors: Guy L. Sibilleau, Roseau, MN (US); Christian Ressler, Thief River Falls, MN (US); Samuel James Sandoz, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 360 days.

(21) Appl. No.: 18/641,788

(22) Filed: Apr. 22, 2024

(65) Prior Publication Data

US 2025/0019036 A1 Jan. 16, 2025

Related U.S. Application Data

(60) Provisional application No. 63/526,456, filed on Jul. 12, 2023.

(51) Int. Cl.
*B62M 27/02* (2006.01)

(52) U.S. Cl.
CPC ....... *B62M 27/02* (2013.01); *B62M 2027/023* (2013.01)

(58) Field of Classification Search
CPC ................................................ B62M 2027/023
See application file for complete search history.

(56) References Cited

U.S. PATENT DOCUMENTS

| | | | | |
|---|---|---|---|---|
| 4,069,882 | A * | 1/1978 | Leonard | B62M 27/02 474/8 |
| 6,695,087 | B2 | 2/2004 | Fournier et al. | |
| 6,823,960 | B2 | 11/2004 | Shimizu et al. | |
| 6,904,990 | B2 * | 6/2005 | Etou | B62M 27/02 180/312 |
| 7,083,024 | B2 | 8/2006 | Bergman et al. | |
| 8,474,783 | B2 | 7/2013 | Hu | |
| 9,618,071 | B2 | 4/2017 | Hirota | |
| 9,828,064 | B2 | 11/2017 | Pard et al. | |
| 11,946,530 | B2 * | 4/2024 | Foxhall | B60K 6/405 |

(Continued)

FOREIGN PATENT DOCUMENTS

| | | |
|---|---|---|
| CN | 105422273 A | 3/2016 |

*Primary Examiner* — Minnah L Seoh
*Assistant Examiner* — Hosam Shabara
(74) *Attorney, Agent, or Firm* — Billion & Armitage

(57) ABSTRACT

A bearing hub is positioned within a drivetrain assembly of a snowmobile. The bearing hub includes a body and a bearing sleeve that is coupled to the body. The body has an upper connection rigidly coupled to the chassis of the snowmobile, an aft connection rigidly coupled to the chassis of the snowmobile, a lower connection rigidly coupled to a heat exchanger and an engine mount connection resiliently coupled to an engine mount to reduce vibration transfer from the engine to the bearing hub. The bearing sleeve has a bearing aperture that is configured to receive a bearing assembly therein. The upper connection, the aft connection and the lower connection form a triangular support arrangement for the driven shaft. The driven shaft is rotatably coupled to the bearing sleeve by the bearing assembly.

20 Claims, 13 Drawing Sheets

(56) References Cited

U.S. PATENT DOCUMENTS

2016/0059929 A1* 3/2016 Pard ...................... B62M 27/02
180/190
2023/0256804 A1* 8/2023 Langaas .................. B60K 5/12
180/184

* cited by examiner 104
106a
102
12
14
106c
14a
106b
110
16b
150
108b
100
106d
112b
112a
114
26

12
18a
18
16a
108a
42
44
108

130
126
128
28
132
124
30
128a
136
138
134
140
42
44
122
142
120

DRIVEN SHAFT BEARING HUBS FOR SNOWMOBILES

CROSS-REFERENCE TO RELATED APPLICATIONS

The present application claims the benefit of U.S. Provisional Application No. 63/526,456, filed Jul. 12, 2023 the entire contents of which are hereby incorporated by reference.

TECHNICAL FIELD OF THE DISCLOSURE

The present disclosure relates, in general, to drivetrain assemblies for use on land vehicles and, in particular, to a driven shaft bearing hub for use on snowmobiles that rigidly supports the driven shaft that transfers torque from a continuously variable transmission to an endless drive track and resiliently supports the engine.

BACKGROUND

Snowmobiles are popular land vehicles used for transportation and recreation in cold and snowy conditions. Certain snowmobiles are designed for specific applications such as trail, utility, mountain, race and crossover, to name a few. Snowmobiles typically include a chassis that supports various components of the snowmobile such as a ground-engaging endless drive track disposed in a longitudinally extending tunnel. The drive track is powered by an engine that enables the drive track to provide ground propulsion for the snowmobile. One or more skis serve to facilitate steering as well as to provide flotation of the front of the snowmobile over the snow. A handlebar assembly is positioned forward of a seat and is operatively linked to the skis for controlling the snowmobile.

Typically, the powertrain of a snowmobile includes the engine that provides torque to a transmission with a driven shaft that transfers torque from the transmission to a reduction drive assembly that provides torque to the endless drive track via a track driveshaft and a track drive sprocket. Due to the requirement that snowmobile powertrains be compact, the direction of torque from the engine to the endless drive track typically changes numerous times. For example, the engine may be positioned centrally within an engine bay of the snowmobile with the transmission on one side of the snowmobile, the reduction drive assembly on the opposite side of the snowmobile and the endless drive track positioned centrally within the tunnel. To transfer torque from the transmission to the reduction drive assembly, the driven shaft typically extends laterally from one side of the snowmobile to the other. For unproblematic operations, it has been found that the driven shaft should be rigidly supported and substantially vibration free while performing its torque transfer functionality.

SUMMARY

In a first aspect, the present disclosure is directed to a bearing hub for a snowmobile that has a chassis, an engine coupled to the chassis, an engine mount coupled to the engine, a heat exchanger coupled to the chassis and a driven shaft having an axis of rotation. The bearing hub has a body and a bearing sleeve that is coupled to the body. The body has an upper connection rigidly coupled to the chassis, an aft connection rigidly coupled to the chassis, a lower connection rigidly coupled to the heat exchanger and an engine mount connection resiliently coupled to the engine mount. The bearing sleeve has a bearing aperture configured to receive a bearing assembly therein. The upper connection, the aft connection and the lower connection form a triangular support arrangement for the driven shaft. The driven shaft is rotatably coupled to the bearing sleeve by the bearing assembly.

In some embodiments, the body of the bearing hub may have a surface and the bearing sleeve may extend generally perpendicularly to the surface. In certain embodiments, the bearing sleeve may include inner and outer cylindrical surfaces that are substantially parallel with the axis of rotation of the driven shaft. In some embodiments, the bearing sleeve may be integral with the body. In certain embodiments, a plurality of lateral support braces may extend between the body and the bearing sleeve and may be circumferentially distributed about at least a portion of the bearing sleeve. In some embodiments, the triangular support arrangement may be a planar triangular support arrangement that is substantially perpendicular to the axis of rotation of the driven shaft.

In certain embodiments, the bearing aperture may be positioned below the upper connection, forward of the aft connection, above the lower connection and above the engine mount connection. In some embodiments, the engine mount connection may be positioned below and forward of the bearing aperture, below and forward of the upper connection, below and forward of the aft connection, and above and forward of the lower connection. In certain embodiments, the upper connection may be positioned above the bearing aperture, above and forward of the aft connection, above and forward of the lower connection, and above and aft of the engine mount connection. In some embodiments, the aft connection may be positioned aft of the bearing aperture, below and aft of the upper connection, above and aft of the lower connection, and above and aft of the engine mount connection. In certain embodiments, the lower connection may be positioned below the bearing aperture, below and aft of the upper connection, below and forward of the aft connection, and below and aft of the engine mount connection.

In a second aspect, the present disclosure is directed to a drivetrain assembly for a snowmobile that has a chassis, an engine coupled to the chassis and a heat exchanger coupled to the chassis. The drivetrain assembly includes a transmission and a driven shaft that is coupled to and configured to receive torque from the transmission. A drive assembly is coupled to and configured to receive torque from the driven shaft. An engine mount coupled to the engine. A bearing hub has a body and a bearing sleeve that is coupled to the body. The body includes an upper connection rigidly coupled to the chassis, an aft connection rigidly coupled to the chassis, a lower connection rigidly coupled to the heat exchanger and an engine mount connection resiliently coupled to the engine mount. The bearing sleeve defines a bearing aperture. A bearing assembly is disposed within the bearing aperture. The upper connection, the aft connection and the lower connection form a triangular support arrangement for the driven shaft. The driven shaft is rotatably coupled to the bearing sleeve by the bearing assembly.

In some embodiments, the transmission may be a continuously variable transmission having a drive pulley, a driven pulley and a drive belt looped around the drive pulley and the driven pulley to transfer torque from the drive pulley to the driven pulley. In certain embodiments, the driven shaft may be coupled to and configured to receive torque from the driven pulley of the continuously variable transmission. In some embodiments, the drive assembly may be a reduction drive assembly configured to be shifted between forward and reverse operations. In certain embodiments, a vibration damper may be positioned within a vibration damper aperture of the engine mount. In such embodiments, the engine mount connection of the bearing hub may be resiliently coupled to the engine mount by the vibration damper to reduce vibration transfer from the engine to the bearing hub.

In a third aspect, the present disclosure is directed to a snowmobile that has a chassis including a tunnel. A powertrain is coupled to the chassis. The powertrain includes an engine and a drivetrain. The drivetrain includes a transmission coupled to the engine, a driven shaft coupled to the transmission and a drive assembly coupled to the driven shaft. A heat exchanger is coupled to the tunnel and positioned aft of the engine. A drive track system is disposed at least partially below the tunnel. The drive track system includes a track driveshaft coupled to the drive assembly, a track drive sprocket coupled to the track driveshaft and a drive track coupled to the track drive sprocket and configured to provide ground propulsion for the snowmobile. An engine mount is coupled to the engine. A bearing hub has a body and a bearing sleeve that is coupled to the body. The body including an upper connection rigidly coupled to the chassis, an aft connection rigidly coupled to the chassis, a lower connection rigidly coupled to the heat exchanger and an engine mount connection resiliently coupled to the engine mount. The bearing sleeve defines a bearing aperture. A bearing assembly is disposed within the bearing aperture. The upper connection, the aft connection and the lower connection form a triangular support arrangement for the driven shaft. The driven shaft is rotatably coupled to the bearing sleeve by the bearing assembly.

In some embodiments, the chassis may include a forward frame assembly and a plate member that is coupled to the forward frame assembly, and the heat exchanger may include an end cap. In such embodiments, the upper connection of the bearing hub may be rigidly coupled to the forward frame assembly, the aft connection of the bearing hub may be rigidly coupled to the plate member and the lower connection of the bearing hub may be rigidly coupled to the end cap of the heat exchanger.

In a fourth aspect, the present disclosure is directed to a snowmobile that has a chassis, an engine including an engine mount, a driven shaft operatively coupled to the engine and a bearing hub supporting a bearing assembly. The driven shaft is rotatably coupled to the bearing hub by the bearing assembly. The bearing hub includes a plurality of connections secured to the chassis. The bearing hub is secured to the engine mount.

In certain embodiments, a heat exchanger may be positioned aftward of the engine and a bracket may extend from the heat exchanger with the engine mount positioned between and secured to the bracket and the bearing hub. In some embodiments, the bracket may be positioned between a longitudinal centerline of the snowmobile and the bearing hub. In certain embodiments, the bearing hub may include a first connection that is secured to an outboard side of the chassis and a second connection that is secured to the bracket. In some embodiments, the engine mount may be positioned between and secured to the bracket and the second connection. In certain embodiments, the chassis may include a forward frame assembly, a tunnel secured to the forward frame assembly and optionally a heat exchanger end cap with the first connection secured to a sidewall of the tunnel or the heat exchanger end cap. In some embodiments, the bearing hub may include a third connection that is secured to the forward frame. In certain embodiments, the third connection may be secured to a removable beam of the forward frame. In some embodiments, the bearing hub may include a fourth connection that is secured to the chassis. In certain embodiments, the forward frame assembly may include a plate member and the fourth connection may be secured to the plate member. In some embodiments, the first, third and fourth connections may define a planar triangular support arrangement that is substantially perpendicular to the axis of rotation of the driven shaft.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

Figure 1A:
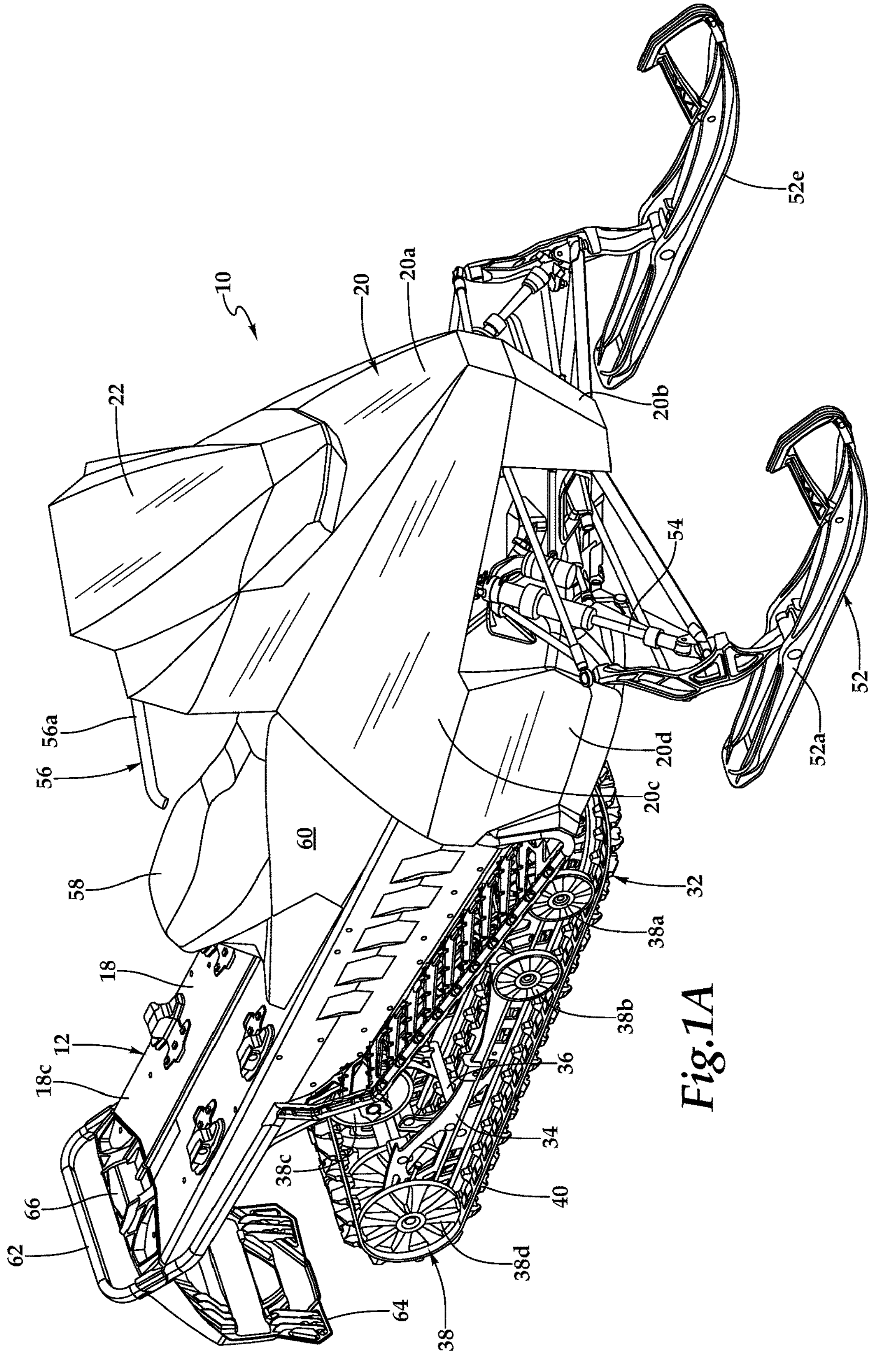
FIGS. 1A-1E are schematic illustrations of a snowmobile having a driven shaft bearing hub in accordance with embodiments of the present disclosure.
Figure 1B:
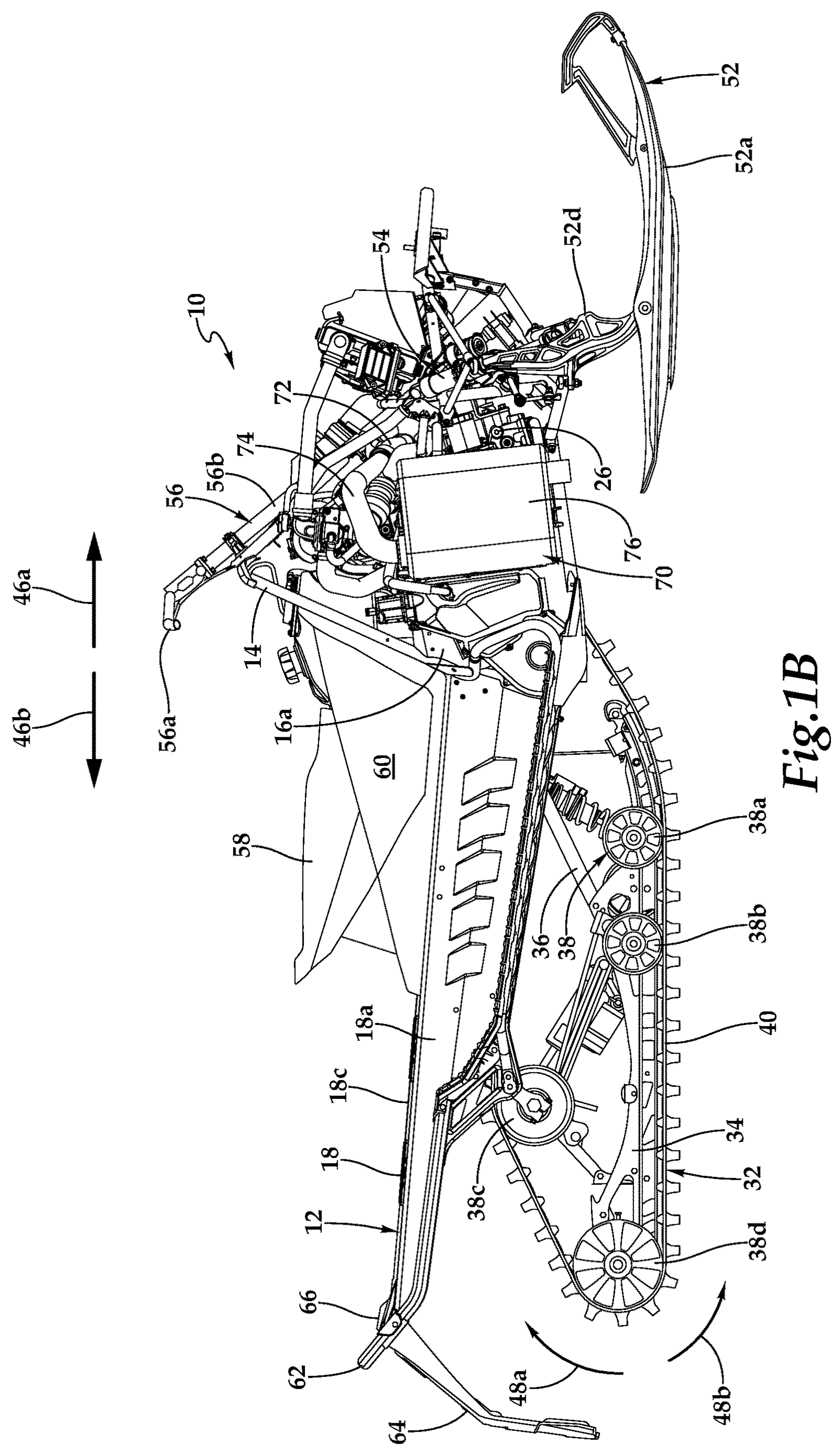
Figure 1C:
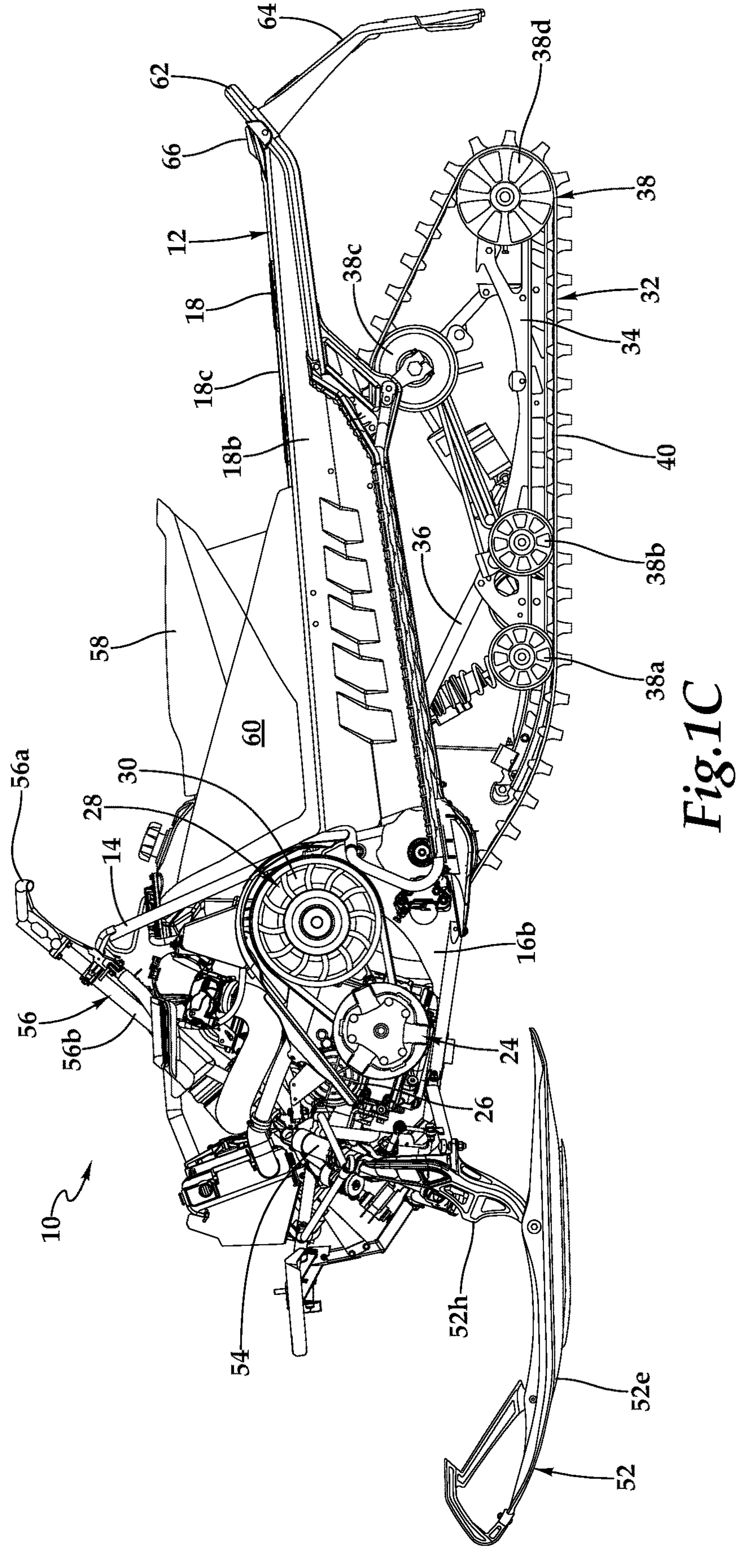
Figure 1D:
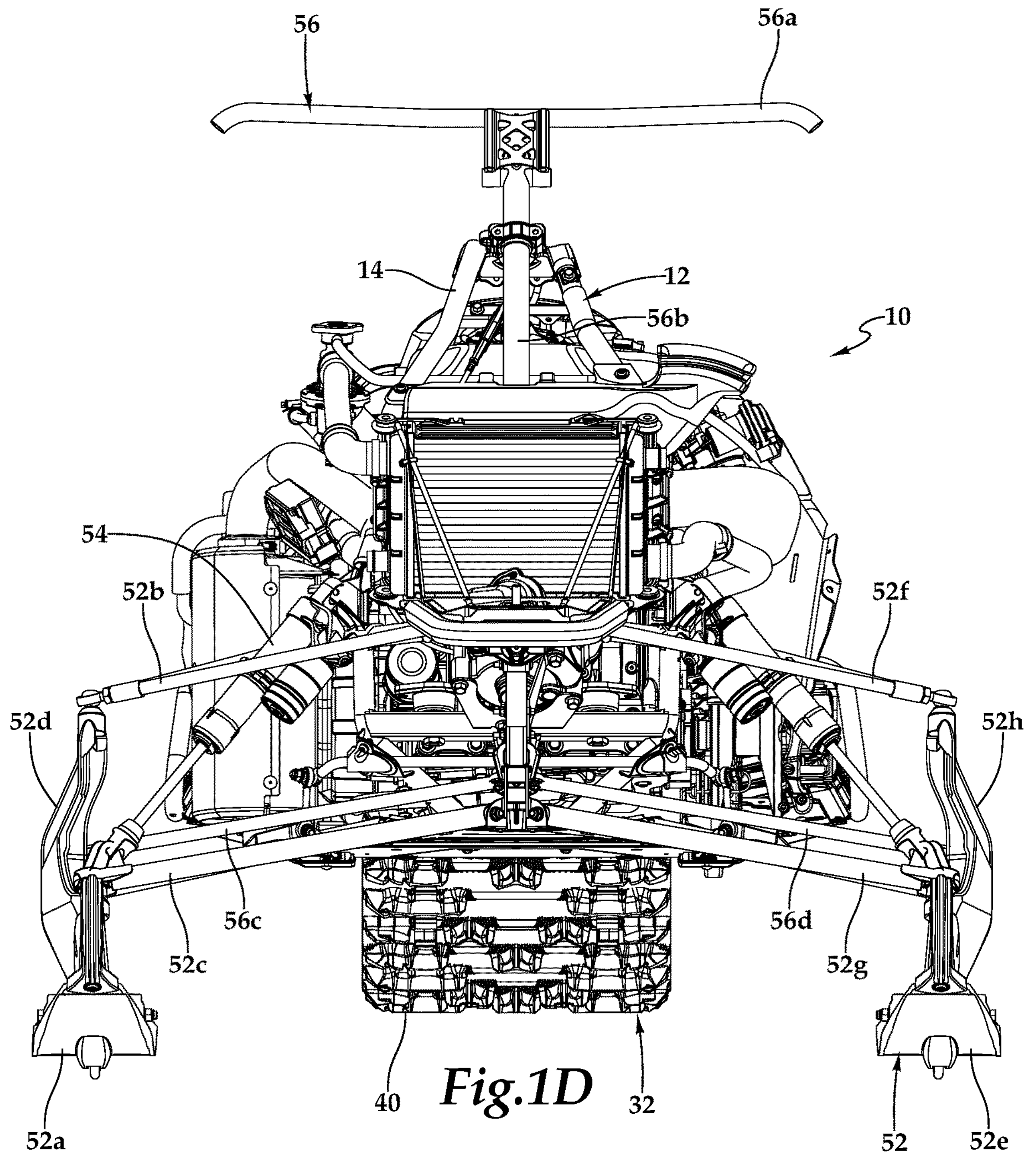
Figure 1E:
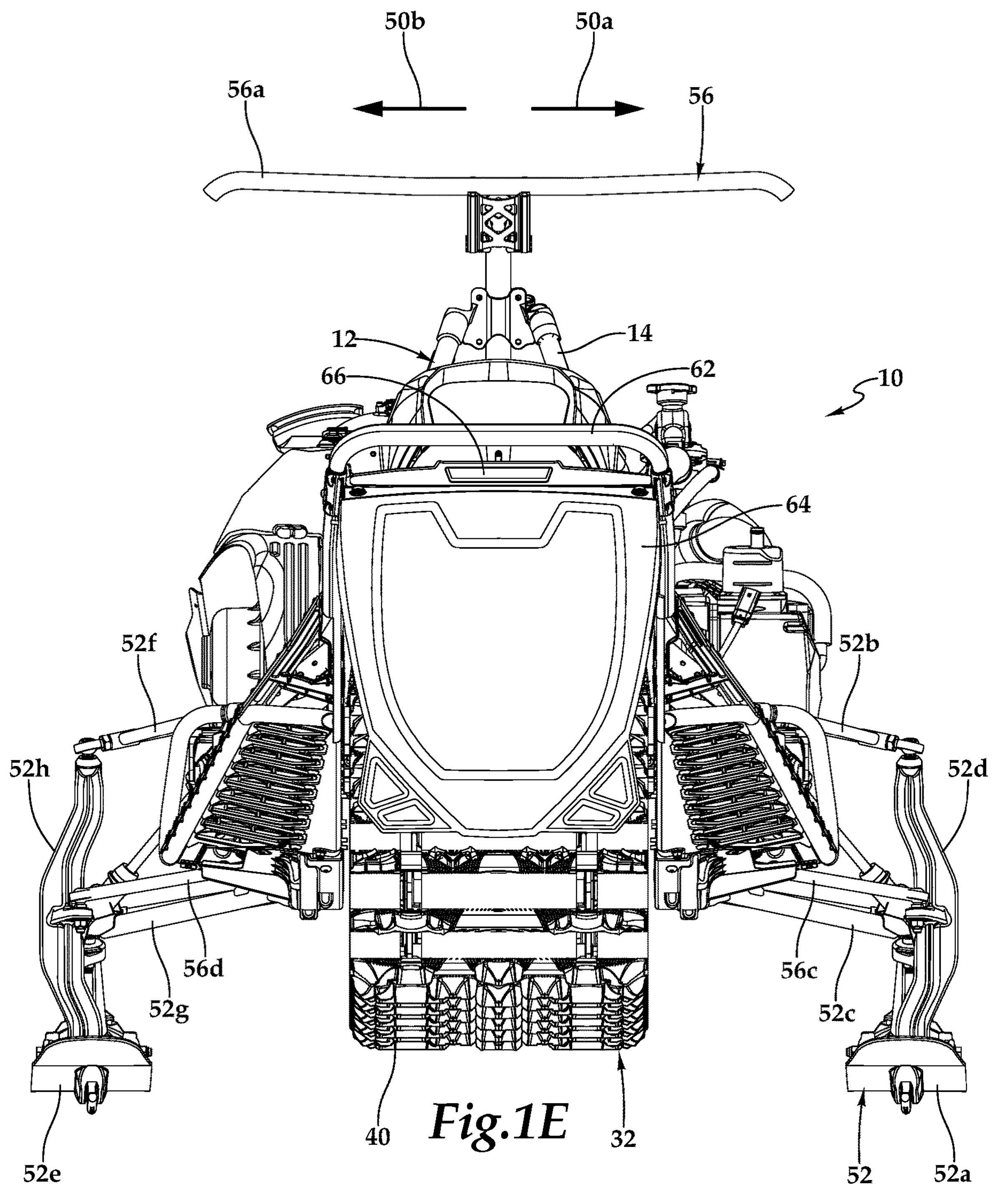

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as “above,” “below,” “upper,” “lower” or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term “coupled” may include direct or indirect coupling by any means, including by mere contact or by moving and/or non-moving mechanical connections.

Referring to FIGS. 1A-1E in the drawings, a land vehicle depicted as a snowmobile is schematically illustrated and generally designated 10. Structural support for snowmobile 10 is provided by a chassis 12 that includes a forward frame assembly 14, a right side plate member 16*a*, a left side plate member 16*b* and a longitudinally extending tunnel 18. Forward frame assembly 14 (see also FIG. 2A) is formed from interconnected tubular members such as round and hollow tubular members comprised of metal, metal alloy, polymeric materials, fiber reinforced polymer composites and/or combinations thereof that are coupled together by welds, bolts, pins or other suitable fastening means. Plate members 16*a*, 16*b* are coupled to and preferably welded to forward frame assembly 14 such that forward frame assembly 14 and plate members 16*a*, 16*b* form a welded frame assembly. Tunnel 18 is coupled to forward frame assembly 14 and/or plate members 16*a*, 16*b* with welds, bolts, rivets or other suitable means. In the illustrated embodiment, tunnel 18 includes a right sidewall 18*a*, a left sidewall 18*b* and a top panel 18*c*. Tunnel 18 may be integrally formed or may consist of multiple members that are coupled together with welds, bolts, rivets or other suitable means. Plate members 16*a*, 16*b* and tunnel 18 may be formed from sheet metal, metal alloy, fiber reinforced polymer or other suitable material or combination of materials. Right side plate member 16*a* may be considered as a forward portion of right sidewall 18*a* of tunnel 18 and left side plate member 16*b* may be considered as a forward portion of left sidewall 18*b* of tunnel 18.

Various components of snowmobile 10 are assembled on or around forward frame assembly 14. One or more body panels 20 cover and protect the various components of snowmobile 10 including parts of forward frame assembly 14. For example, a hood panel 20*a*, a nose panel 20*b*, an upper right side panel 20*c* and a lower right side panel 20*d* shield underlying componentry from the snow and terrain. Similarly, an upper left side panel and a lower left side panel (not visible) also shield underlying componentry from the snow and terrain. In the illustrated embodiment, snowmobile 10 has a windshield 22 that shields the rider of snowmobile 10 from snow, terrain and frigid air during operation. Even through snowmobile 10 has been described and depicted as including specific body panels 20, it should be understood by those having ordinary skill in the art that a snowmobile of the present disclosure may include any number of body panels in any configuration to provide the shielding functionality. In addition, it should be understood by those having ordinary skill in the art that the right side and the left side of snowmobile 10 will be with reference to a rider of snowmobile 10 with the right side of snowmobile 10 corresponding to the right side of the rider and the left side of snowmobile 10 corresponding to the left side of the rider.

Body panels 20 have been removed from snowmobile 10 in FIGS. 1B-1E to reveal the underlying components of snowmobile 10. For example, snowmobile 10 has a powertrain 24 that includes an engine 26 and a drivetrain 28 both of which are coupled to forward frame assembly 14. Engine 26 resides in an engine bay formed within forward frame assembly 14. Engine 26 may be any type of engine such as a four-stroke engine, a two-stroke engine, an electric motor or other prime mover. In the illustrated embodiment, engine 26 is an internal combustion engine such as a naturally aspirated internal combustion engine or a forced induction internal combustion engine that includes, for example, one or more turbochargers and/or superchargers. Drivetrain 28 includes a transmission 30 such as a continuously variable transmission, an electrically variable transmission or other suitable transmission type for varying the ratio of the engine output speed to the drive track input speed.

Figure 3:
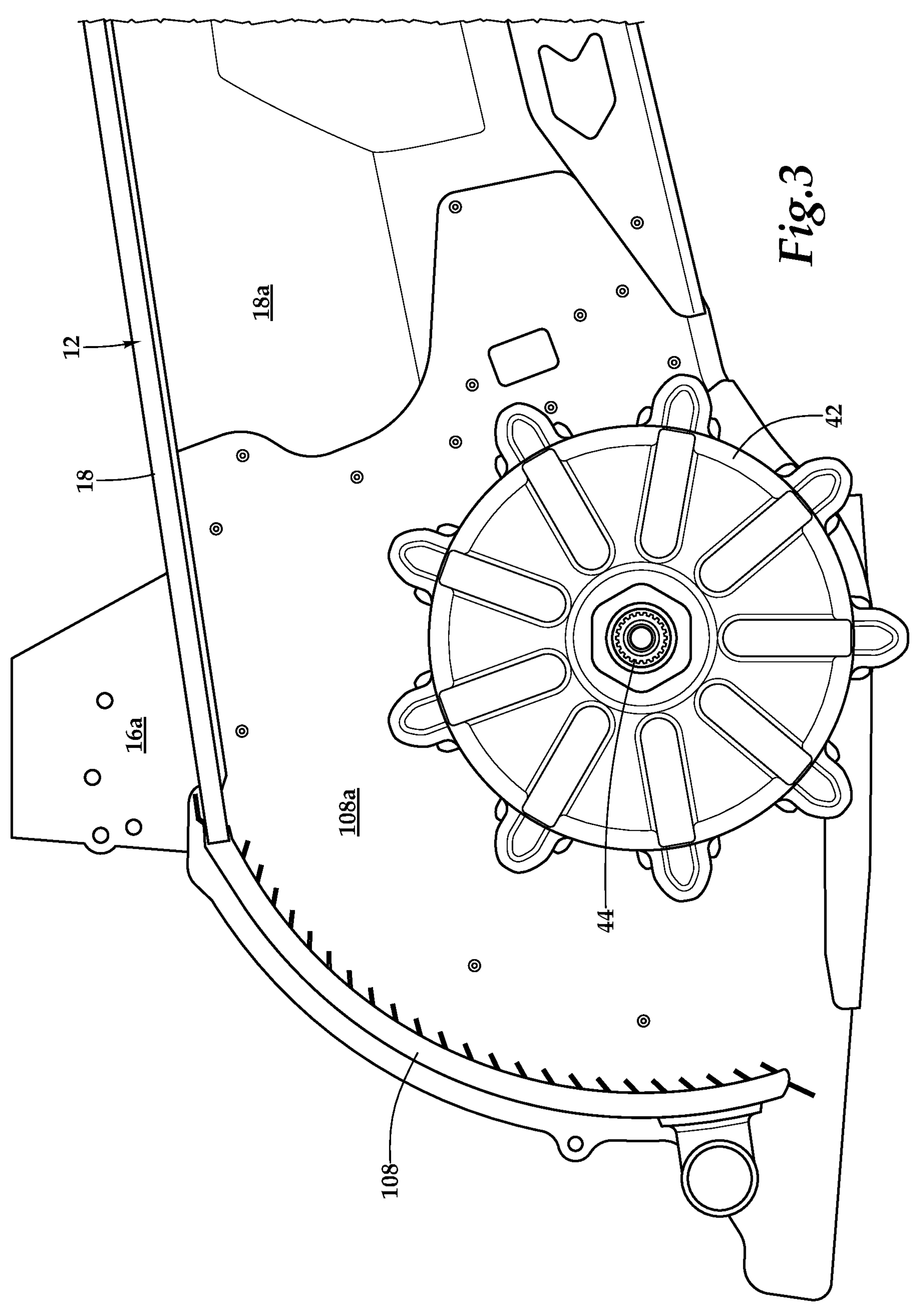
FIG. 3 is a side view of a forward portion of a tunnel of a snowmobile in accordance with embodiments of the present disclosure.

A drive track system 32 is at least partially disposed within and/or below tunnel 18 and is in contact with the ground to provide ground propulsion for snowmobile 10. Torque and rotational energy are provided to drive track system 32 from engine 26 via drivetrain 28. Drive track system 32 includes a track frame 34, an internal suspension 36, a plurality of idler wheels 38 such as idler wheels 38*a*, 38*b*, 38*c*, 38*d* and an endless track 40. Track frame 34 may be coupled to forward frame assembly 14 via a swing arm having a coil spring, a rigid strut, a torsion spring, an elastomeric member or any other suitable coupling configuration. Endless track 40 is driven by a track drive sprocket 42 via a track driveshaft 44 (see also FIG. 3) that is rotated responsive to torque provided from powertrain 24. Endless track 40 rotates around track frame 34 and idler wheels 38 to propel snowmobile 10 in either the forward direction, as indicated by arrow 46*a*, or the backwards direction, as indicated by arrow 46*b* in FIG. 1B. When viewed from the right side of snowmobile 10, endless track 40 rotates around track frame 34 and idler wheels 38 in the clockwise direction, as indicated by arrow 48*a*, to propel snowmobile 10 in the forward direction 46*a*. Endless track 40 rotates around track frame 34 and idler wheels 38 in the counterclockwise direction, as indicated by arrow 48*b*, to propel snowmobile 10 in the backward direction 46*b*. The forward and backward directions also represent the longitudinal direction of snowmobile 10 with the lateral direction of snowmobile 10 being normal thereto and represented by the rightward direction, as indicated by arrow 50*a*, and the leftward direction, as indicated by arrow 50*b* in FIG. 1E. The backward direction may also be referred to herein as the aftward direction.

Snowmobile 10 has a ski system 52 and a front suspension assembly 54 that provide front end support for snowmobile 10. Ski system 52 includes a right ski 52*a* that is coupled to forward frame assembly 14 by upper and lower A-arms 52*b*, 52*c* and right spindle 52*d*. Ski system 52 also includes a left ski 52*e* that is coupled to forward frame assembly 14 by upper and lower A-arms 52*f*, 52*g* and left spindle 52*h*. Skis 52*a*, 52*e* are interconnected to a steering system 56 including a handlebar assembly 56*a*, a steering column 56*b*, a right tie rod 56*c* and a left tie rod 56*d* that enable the rider to steer snowmobile 10. For example, when handlebar assembly 56*a* is rotated, skis 52*a*, 52*e* responsively pivot to turn snowmobile 10. The rider controls snowmobile 10 from a seat 58 that is position atop a fuel tank 60, above tunnel 18, aft of handlebar assembly 56*a* and aft of forward frame assembly 14. Snowmobile 10 has a lift bumper 62 that is coupled to an aft end of tunnel 18 that enables a person to lift the rear end of snowmobile 10 in the event snowmobile 10 becomes stuck or needs to be repositioned when it is not moving. Snowmobile 10 has a snow flap 64 that deflects snow emitted by endless track 40. In the illustrated embodiment, snow flap 64 is coupled to lift bumper 62. In other embodiments, a snow flap may be coupled directly to tunnel 18. A taillight housing 66 is also coupled to lift bumper 62 and houses a taillight of snowmobile 10. Snowmobile 10 has an exhaust system 70 that includes an exhaust manifold 72 that is coupled to engine 26, an exhaust duct 74 and a muffler 76. Exhaust system 70 is configured to direct high-temperature exhaust gases away from engine 26 and the rider of snowmobile 10.

It should be appreciated that snowmobile 10 is merely illustrative of a variety of vehicles that can implement the embodiments disclosed herein. Other vehicle implementations can include motorcycles, snow bikes, all-terrain vehicles (ATVs), utility vehicles, recreational vehicles, scooters, automobiles, mopeds, straddle-type vehicles and the like. As such, those skilled in the art will recognize that the embodiments disclosed herein can be integrated into a variety of vehicle configurations. It should be appreciated that even though ground-based vehicles are particularly well-suited to implement the embodiments of the present disclosure, airborne vehicles and devices such as aircraft can also implement the embodiments.

Figure 2A:
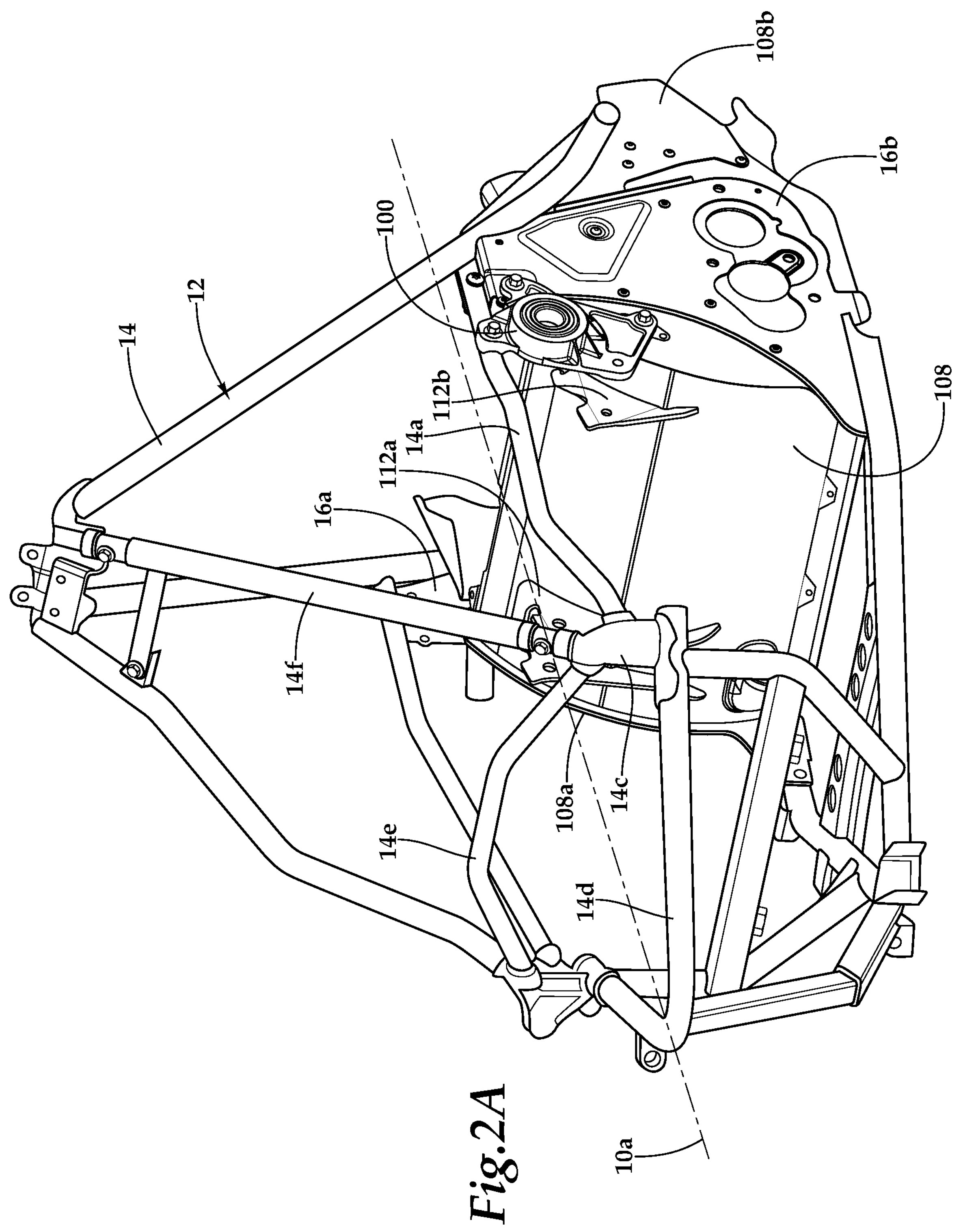
FIGS. 2A-2B are isometric and side views of a driven shaft bearing hub in an operating position on a snowmobile in accordance with embodiments of the present disclosure.
Figure 2B:
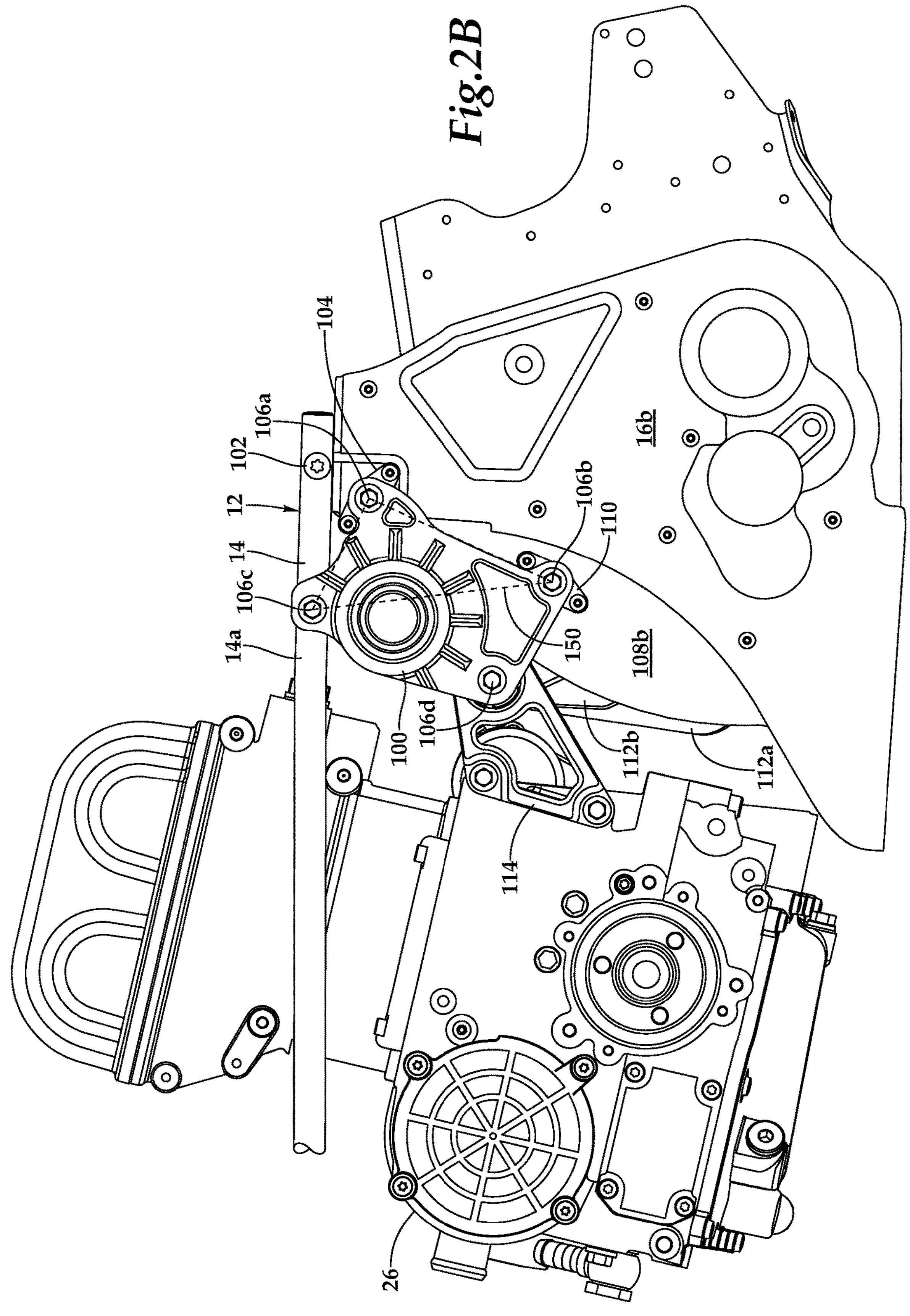

Referring additionally to FIGS. 2A-2B of the drawings, details regarding the location of a driven shaft bearing hub 100 for snowmobile 10 will now be discussed. FIG. 2A depicts a forward portion of chassis 12 including forward frame assembly 14, right side plate member 16*a* and left side plate member 16*b*. FIG. 2B depicts a portion of chassis 12 including left beam 14*a* and left side plate member 16*b*. In the illustrated embodiment, left beam 14*a* is coupled to left side plate member 16*b* via fastener 102. As best seen in FIG. 2A, left beam 14*a* extends generally longitudinally forward and is coupled to a joint 14*c* that joins together nose rail 14*d*, cross member 14*e* and left-forward spar 14*f*. As such, left beam 14*a* is selectively attachable to and removable from chassis 12. A mounting bracket 104 is coupled to left side plate member 16*b* via a pair of rivets. Mounting bracket 104 has a central aperture, such as a threaded aperture, for receiving a fastener, such as a bolt 106*a* therein. Positioned between right side plate member 16*a* and left side plate member 16*b* is an arcuate heat exchanger 108 having right side end cap 108*a* and left side end cap 108*b*. Arcuate heat exchanger 108 is coupled to a forward portion of tunnel 18 (see also FIG. 3) and to forward frame assembly 14. Arcuate heat exchanger 108 is positioned aft of engine 26 and is part of an engine cooling system. Arcuate heat exchanger 108 is configured to remove heat from an engine cooling fluid that circulates therethrough responsive to snow in tunnel 18. Together with right side plate member 16*a*, right side end cap 108*a* may be considered a part of the forward portion of right sidewall 18*a* of tunnel 18. Likewise, together with left side plate member 16*b*, left side end cap 108*b* may be considered a part of forward portion of left sidewall 18*b* of tunnel 18. Left side end cap 108*b* includes a mounting bracket 110 that is coupled thereto via a pair of rivets. Mounting bracket 110 has an aperture, such as a threaded aperture, for receiving a fastener, such as a bolt 106*b* therein.

A pair of brackets is coupled to and preferably welded to a front side of arcuate heat exchanger 100. Specifically, bracket 112*a* is coupled toward the right side of arcuate heat exchanger 108 and to the right side of longitudinal centerline 10*a* of snowmobile 10. Likewise, bracket 112*b* is coupled toward the left side of arcuate heat exchanger 108 and to the left side of longitudinal centerline 10*a* of snowmobile 10. Bracket 112*a* is configured to resiliently couple with a right-rear engine mount (not visible) that supports engine 26. Bracket 112*b* is configured to resiliently couple with a left-rear engine mount 114 that supports engine 26. In the illustrated embodiment, bearing hub 100 is coupled to an outboard side of chassis 12. More particularly bearing hub 100 is coupled to left beam 14*a* of forward frame assembly 14 via a fastener depicted as a bolt 106*c*, coupled to left side plate member 16*b* via a fastener depicted as bolt 106*a* and coupled to left side end cap 108*b* of heat exchanger 108 via a fastener depicted as bolt 106*b*. Bearing hub 100 is also coupled to bracket 112*b* via a fastener depicted as bolt 106*d*. As discussed herein, left-rear engine mount 114 is partially disposed between bracket 112*b* and bearing hub 100 and is resiliently supported by bolt 106*d*. In the illustrated embodiment, left-rear engine mount 114 and bracket 112*b* are positioned between longitudinal centerline 10*a* of snowmobile 10 and bearing hub 100.

Figure 4A:
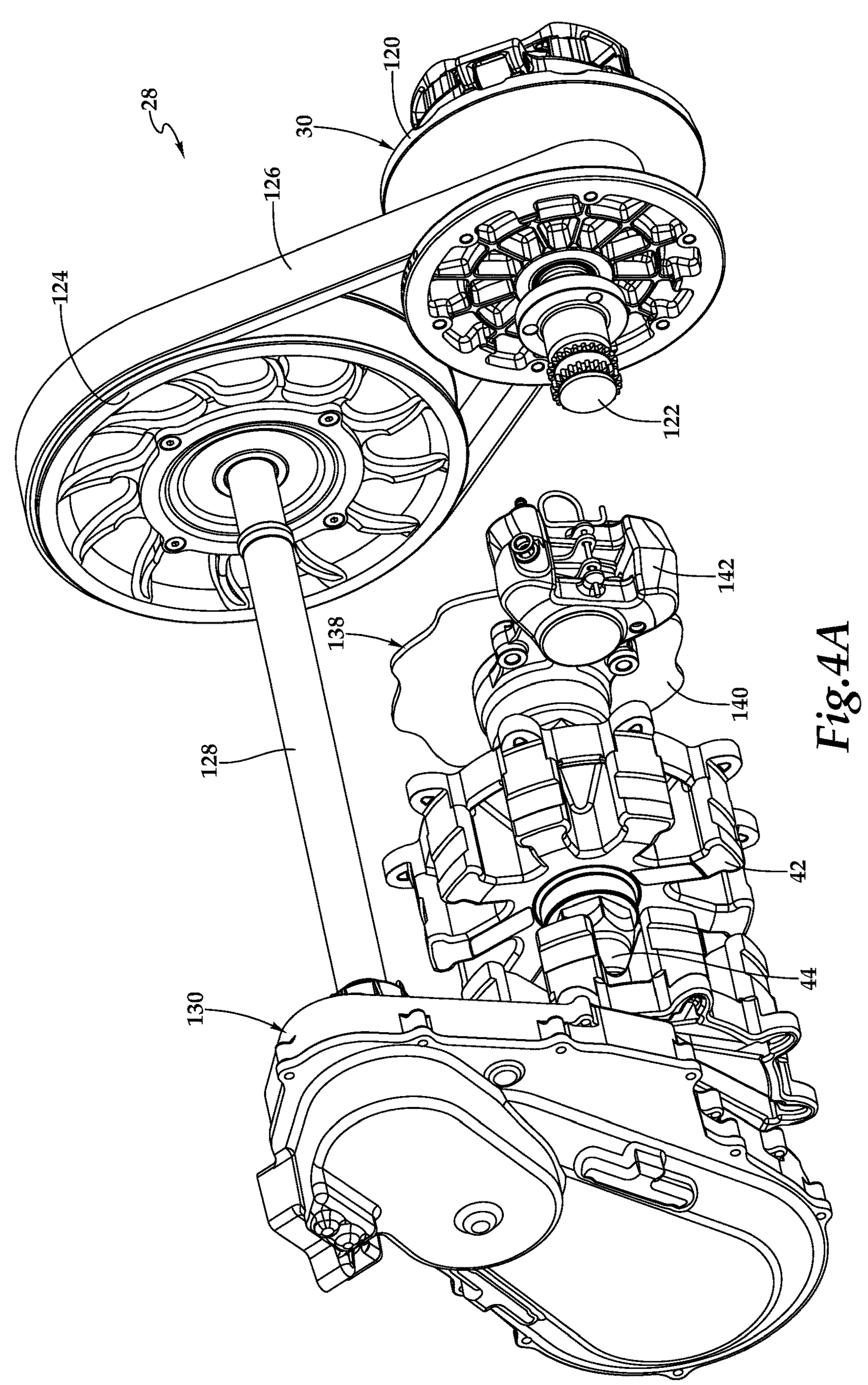
FIGS. 4A-4B are isometric views of a drivetrain for a snowmobile in accordance with embodiments of the present disclosure.
Figure 4B:
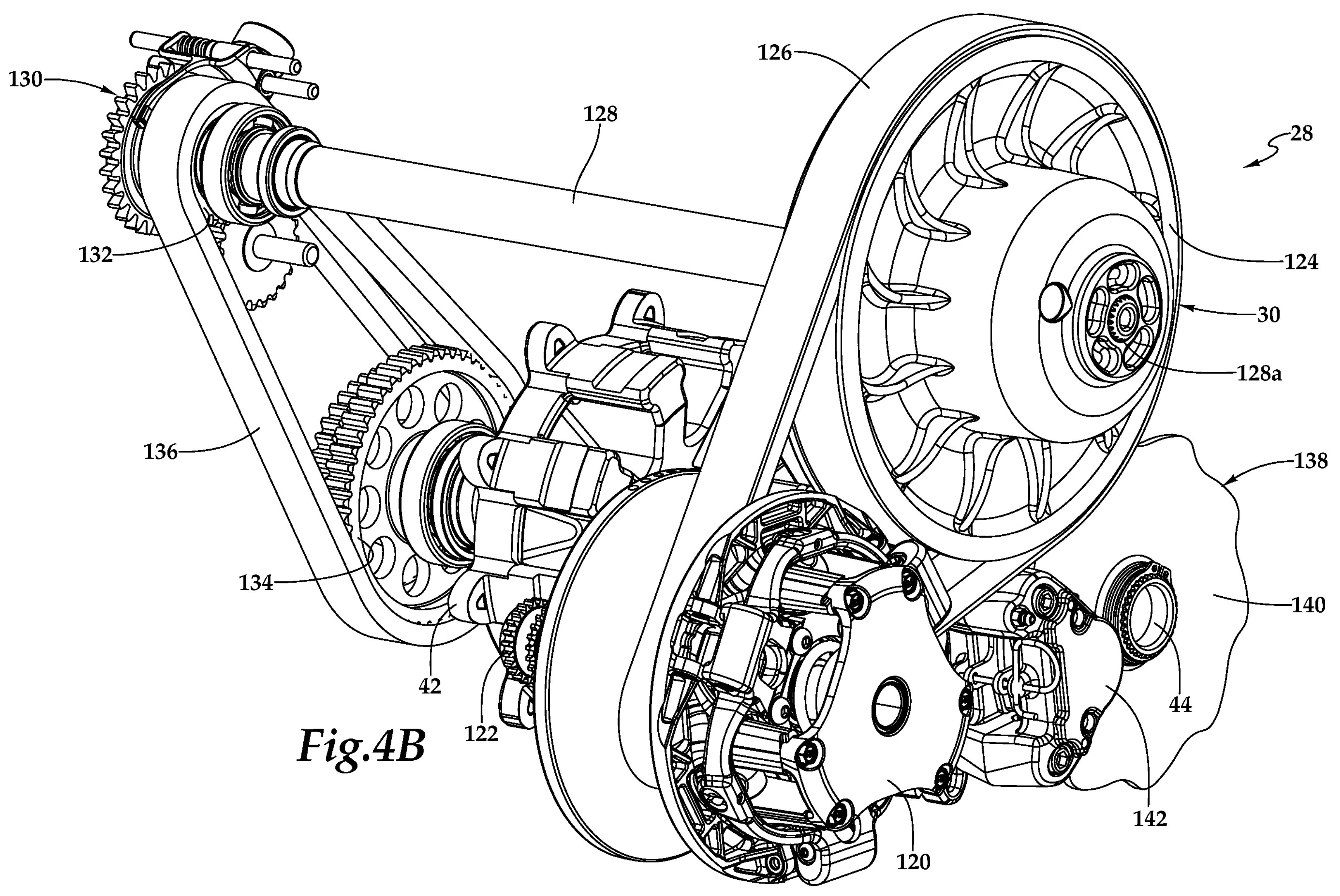

Referring next to FIGS. 4A-4B of the drawings, drivetrain 28 will be discussed in greater detail. Drivetrain 28 includes transmission 30, depicted as a continuously variable transmission, which includes a drive pulley 120 that receives torque and rotational energy from engine 26 via engine driveshaft 122, a driven pulley 124 and a drive belt 126 that is looped around drive pulley 120 and driven pulley 124 to transfer torque from drive pulley 120 to driven pulley 124. The use of a continuously variable transmission has the advantages of continuously changing its gear ratio such that at any engine speed, the continuously variable transmission is configured to operate at peak performance. This is achieved by varying the width of drive pulley 120 and driven pulley 124 depending on the power requirement of snowmobile 10. In operation, when one of drive pulley 120 and driven pulley 124 gets larger, the other of drive pulley 120 and driven pulley 124 gets smaller. Since neither drive pulley 120, driven pulley 124 nor drive belt 126 are fixed, continuously variable transmission is configured to provide an infinite number of gear ratios.

Driven pulley 124 provides torque and rotational energy to a driven shaft 128. In the illustrated embodiment, driven shaft 128 includes multiple splined sections including input splines 128*a* and output splines 128*b* (see also FIGS. 5A-5B). Input splines 128*a* are in mesh with splines within driven pulley 124 such that operation of transmission 30 rotates driven shaft 128. Output splines 128*b* are in mesh with splines within drive assembly 130 that is depicted as a reduction drive assembly that is shiftable been a forward mode and a reverse mode which determines the direction 48*a* or 48*b* (see also FIG. 1B) that endless track 40 rotates around track frame 34 and idler wheels 38 and thus the direction 46*a* or 46*b* of travel of snowmobile 10. Drive assembly 130 includes a drive pulley 132 that receives torque and rotational energy from driven shaft 128, a driven pulley 134 and a drive belt 136 that is looped around drive pulley 132 and driven pulley 134 to transfer torque from drive pulley 132 to driven pulley 134. Driven pulley 134 provides torque and rotational energy to track driveshaft 44 (see also FIG. 3) that has a splined coupling with track drive sprocket 42 that drives endless track 40 around track frame 34 and idler wheels 38 (see also FIG. 1B) to propel snowmobile 10. Track driveshaft 44 also has a splined coupling with a disc-and-caliper braking system 138 that includes a brake disc 140 and a brake caliper 142 used to provide a stopping force for snowmobile 10.

Figures 5A, 5B:
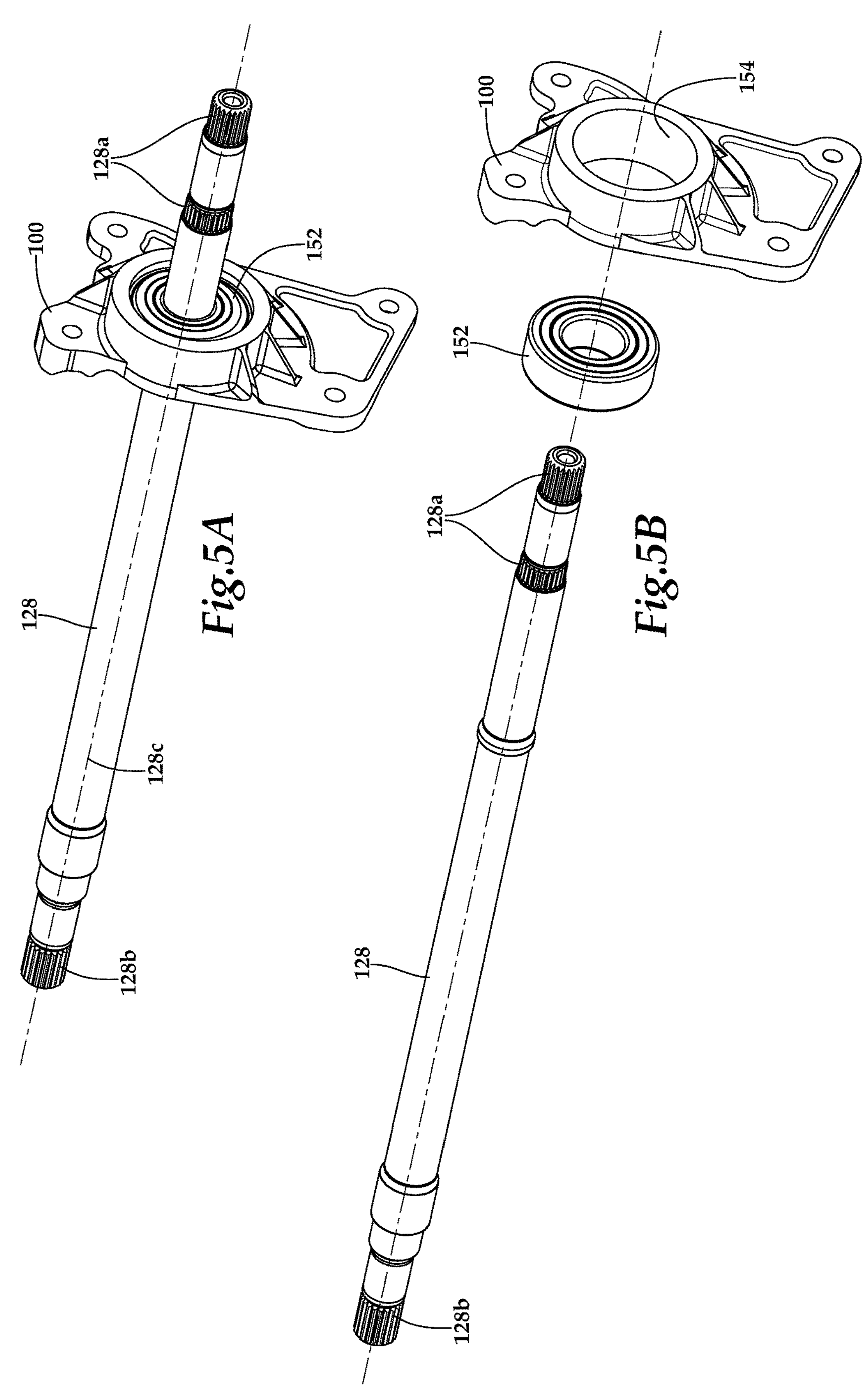
FIGS. 5A-5B are assembly and exploded views of a driven shaft, a bearing assembly and a driven shaft bearing hub for a snowmobile in accordance with embodiments of the present disclosure.

Referring additionally to FIGS. 5A-5B, the operation of driven shaft 128 and bearing hub 100 will now be described. As discussed herein, bearing hub 100 is rigidly coupled to chassis 12 and heat exchanger 108. More specifically, bearing hub 100 is rigidly coupled to left beam 14*a* of forward frame assembly 14, left side plate member 16*b* and left side end cap 108*b* of heat exchanger 108 forming a triangular support arrangement 150 for driven shaft 128 (see also FIG. 2B). Driven shaft 128 is rotatably coupled to bearing hub 100 via a bearing assembly 152, such as a ball bearing assembly, which is received on driven shaft 128 and within a bearing aperture 154 of bearing hub 100. The triangular support arrangement 150 created by bearing hub 100 rigidly supports driven shaft 128 allowing driven shaft 128 to transfer torque and rotational energy from transmission 30 to drive assembly 130. Preferably, the plane formed by triangular support arrangement 150 is substantially perpendicular to an axis of rotation 128*c* of driven shaft 128. In addition to the rigid support provided by bearing hub 100 for driven shaft 128, the resilient connection between bearing hub 100 and left-rear engine mount 114 reduces and/or eliminates any vibration transfer from engine 26 to driven shaft 128 which could adversely affect the performance and longevity of driven shaft 128.

Figure 6A:
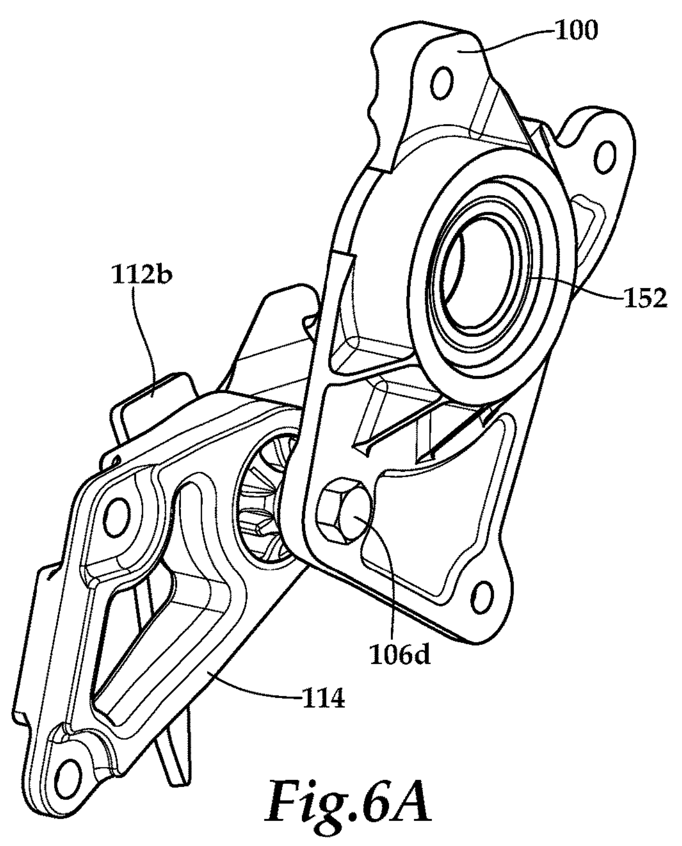
FIGS. 6A-6B are assembly and exploded views of a driven shaft bearing hub, an engine mount and a mounting bracket for a snowmobile in accordance with embodiments of the present disclosure.
Figure 6B:
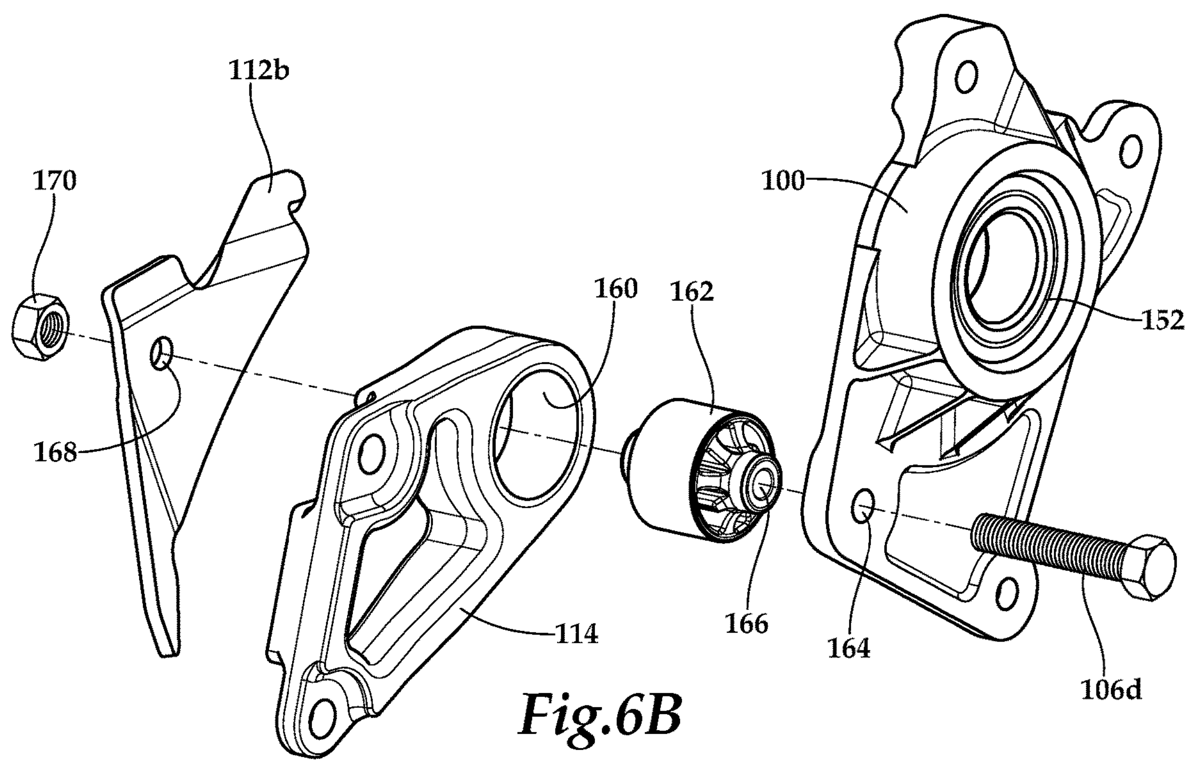

Referring additionally to FIGS. 6A-6B in the drawings, the resilient coupling of bearing hub 100 to left-rear engine mount 114 will now be described. As discussed herein, a pair of brackets is coupled to and preferably welded to a front side of arcuate heat exchanger 100. Specifically, bracket 112*b* is welded proximate the left side of arcuate heat exchanger 108 (see also FIG. 2A). In addition, bearing hub 100 is rigidly coupled to left beam 14*a* of forward frame assembly 14, left side plate member 16*b* and left side end cap 108*b* of heat exchanger 108 such that a gap is provided between bracket 112*b* and bearing hub 100. This gap is sized such that left-rear engine mount 114 may be received therein. Specifically, left-rear engine mount 114 includes a vibration damper aperture 160 that receives a vibration damper 162 therein. Left-rear engine mount 114 together with vibration damper 162 are positioned between bracket 112*b* and bearing hub 100 when engine 26 is being installed in snowmobile 10. Specifically, bracket 112*b*, left-rear engine mount 114 and bearing hub 100 are aligned such that bolt 106*d* can be received through aperture 164 of bearing hub 100, aperture 166 of vibration damper 162 and aperture 168 of bracket 112*b* and such that bolt 106*b* and nut 170 secure left-rear engine mount 114 between bracket 112*b* and bearing hub 100. Due to the resilient nature of vibration damper 162, vibration transfer from engine 26 to bearing hub 100 and thus to driven shaft 128 is reduced and/or eliminated.

Figures 7A, 7B, 7C:
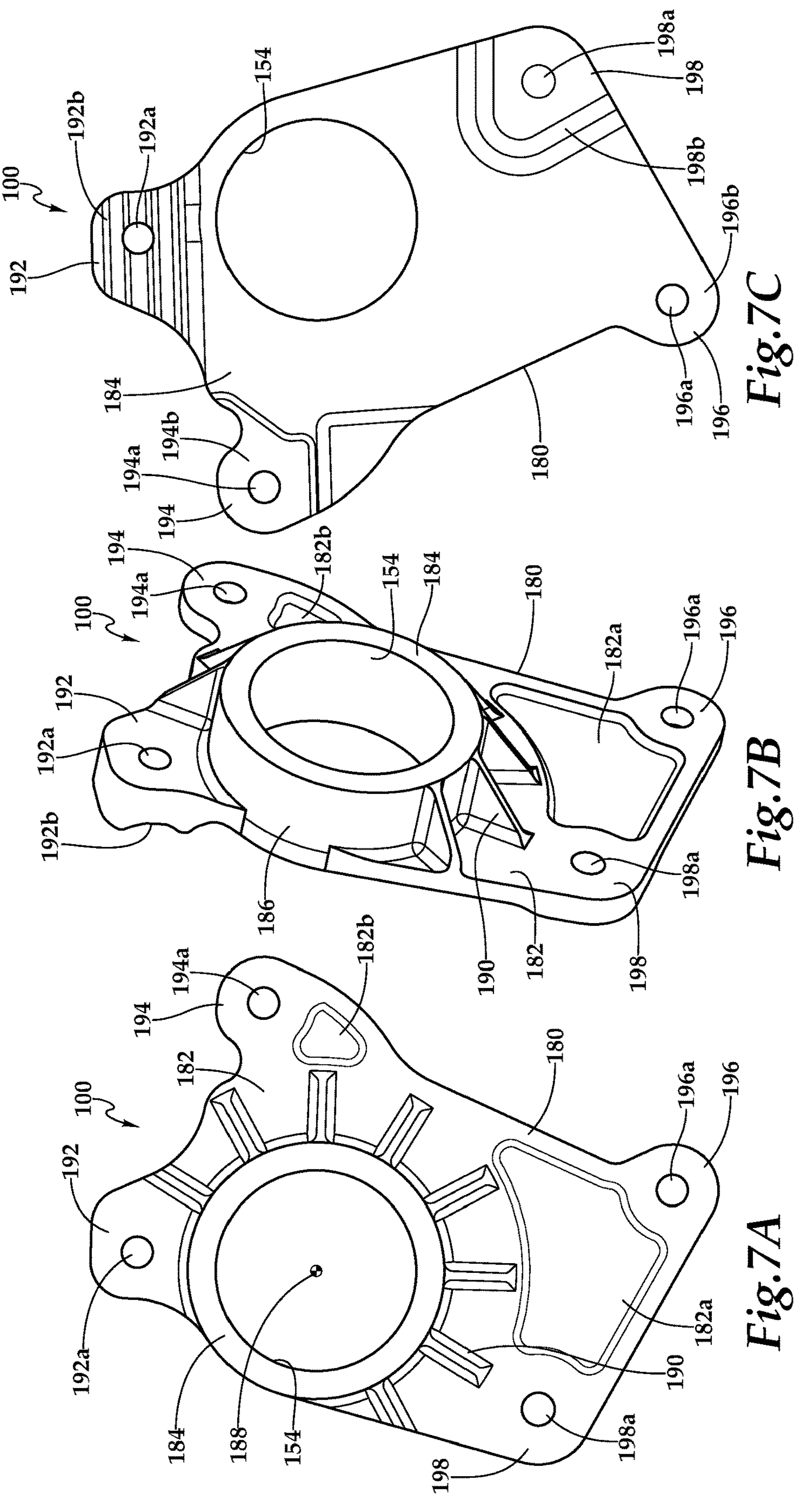
FIGS. 7A-7C are front, isometric and rear views of a driven shaft bearing hub for a snowmobile in accordance with embodiments of the present disclosure.

Referring additionally to FIGS. 7A-7C in the drawings, additional details regarding bearing hub 100 will now be disclosed. Bearing hub 100 has a body 180 having an outboard surface 182 and an inboard surface 184. Outboard surface 182 is a generally planar surface that is substantially perpendicular to the axis of rotation 128*c* of driven shaft 128 (see also FIG. 5A). Outboard surface 182 has a pair of patterns 182*a*, 182*b* cut therein the are designed to reduce the weight of bearing hub 100. Even though bearing hub 100 has particular patterns cut in outboard surface 182, it should be understood by those having ordinary skill in the art that an outboard surface of a bearing hub could have alternate patterns cut therein including more or less than two patterns such as no patterns. Bearing hub 100 has a bearing sleeve 184 that extends generally perpendicularly to outboard surface 182. Bearing sleeve 184 includes an inner cylindrical surface referred to herein as bearing aperture 154 and an outer cylindrical surface 186. In the illustrated embodiment, bearing aperture 154 and outer cylindrical surface 186 share a common axis, indicated by target 188, that is coincident with axis rotation 128*c* of driven shaft 128. In illustrated embodiment, bearing sleeve 184 is integral with body 180 and may be formed together from a metal using, for example, a casting process. Bearing sleeve 184 includes a plurality of lateral support braces, such as lateral support brace 190, that extend between body 180 and bearing sleeve 184. In the illustrated embodiment, the lateral support braces are circumferentially distributed about a two hundred and seventy degree portion of bearing sleeve 184 and more particularly, are uniformly circumferentially distributed at thirty degree intervals about a two hundred and seventy degree portion of bearing sleeve 184.

In its installed position on snowmobile 10, bearing hub 100 has an upper connection 192 that includes an upper portion of body 180, an aperture 192*a* configured to receive bolt 106*c* therein and a chassis interface 192*b* configured to mate with a surface of left beam 14*a* (see also FIG. 2B). Bearing hub 100 also has an aft connection 194 that includes an aft portion of body 180, an aperture 194*a* configured to receive bolt 106*a* therein and a chassis interface 194*b* configured to mate with a surface of mounting bracket 104 of left side plate member 16*b*. In addition, bearing hub 100 has a lower connection 196 that includes a lower portion of body 180, an aperture 196*a* configured to receive bolt 106*b* therein and a heat exchanger interface 196*b* configured to mate with a surface of mounting bracket 110 of left side end cap 108*b*. Bearing hub 100 further has an engine mount connection 198 that includes a forward portion of body 180, an aperture 198*a* configured to receive bolt 106*d* therein and vibration damper interface 198*b* configured to mate with vibration damper 162.

In this installed position on snowmobile 10, upper connection 192 is above bearing aperture 154, above and forward of the aft connection 194, above and forward of lower connection 196, and above and aft of engine mount connection 198. Aft connection 194 is positioned aft of bearing aperture 154, below and aft of upper connection 192, above and aft of lower connection 196, and above and aft of engine mount connection 198. Lower connection 196 is positioned below bearing aperture 154, below and aft of upper connection 192, below and forward of aft connection 194, and below and aft of engine mount connection 198. Engine mount connection 198 is positioned below and forward of bearing aperture 154, below and forward of upper connection 192, below and forward of aft connection 194, and above and forward of lower connection 196. Bearing aperture is positioned below upper connection 192, forward of aft connection 194, above lower connection 196 and above engine mount connection 198.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. For example, numerous combinations of the features disclosed herein will be apparent to persons skilled in the art including the combining of features described in different and diverse embodiments, implementations, contexts, applications and/or figures. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A bearing hub for a snowmobile having a chassis, an engine coupled to the chassis, an engine mount coupled to the engine, a heat exchanger coupled to the chassis and a driven shaft having an axis of rotation, the bearing hub comprising:

a body having an upper connection rigidly coupled to the chassis, an aft connection rigidly coupled to the chassis, a lower connection rigidly coupled to the heat exchanger and an engine mount connection resiliently coupled to the engine mount; and a bearing sleeve coupled to the body, the bearing sleeve having a bearing aperture configured to receive a bearing assembly therein;

wherein, the upper connection, the aft connection and the lower connection form a triangular support arrangement for the driven shaft; and wherein, the driven shaft is rotatably coupled to the bearing sleeve by the bearing assembly.

2. The bearing hub as recited in claim 1 wherein, the body has a surface; and wherein, the bearing sleeve extends generally perpendicularly to the surface.

3. The bearing hub as recited in claim 1 wherein, the bearing sleeve further comprises inner and outer cylindrical surfaces that are substantially parallel with the axis of rotation of the driven shaft.

4. The bearing hub as recited in claim 1 wherein, the bearing sleeve is integral with the body.

5. The bearing hub as recited in claim 1 further comprising a plurality of lateral support braces extending between the body and the bearing sleeve, the lateral support braces circumferentially distributed about at least a portion of the bearing sleeve.

6. The bearing hub as recited in claim 1 wherein, the triangular support arrangement further comprises a planar triangular support arrangement that is substantially perpendicular to the axis of rotation of the driven shaft.

7. The bearing hub as recited in claim 1 wherein, the bearing aperture is positioned below the upper connection, forward of the aft connection, above the lower connection and above the engine mount connection.

8. The bearing hub as recited in claim 1 wherein, the engine mount connection is positioned below and forward of the bearing aperture, below and forward of the upper connection, below and forward of the aft connection, and above and forward of the lower connection.

9. The bearing hub as recited in claim 1 wherein, the upper connection is positioned above the bearing aperture, above and forward of the aft connection, above and forward of the lower connection, and above and aft of the engine mount connection.

10. The bearing hub as recited in claim 1 wherein, the aft connection is positioned aft of the bearing aperture, below and aft of the upper connection, above and aft of the lower connection, and above and aft of the engine mount connection.

11. The bearing hub as recited in claim 1 wherein, the lower connection is positioned below the bearing aperture, below and aft of the upper connection, below and forward of the aft connection, and below and aft of the engine mount connection.

12. A drivetrain assembly for a snowmobile having a chassis, an engine coupled to the chassis and a heat exchanger coupled to the chassis, the drivetrain assembly comprising:

a transmission;

a driven shaft coupled to and configured to receive torque from the transmission;

a drive assembly coupled to and configured to receive torque from the driven shaft;

an engine mount coupled to the engine;

a bearing hub having a body and a bearing sleeve coupled to the body, the body including an upper connection rigidly coupled to the chassis, an aft connection rigidly coupled to the chassis, a lower connection rigidly coupled to the heat exchanger and an engine mount connection resiliently coupled to the engine mount, the bearing sleeve defining a bearing aperture; and a bearing assembly disposed within the bearing aperture;

wherein, the upper connection, the aft connection and the lower connection form a triangular support arrangement for the driven shaft; and wherein, the driven shaft is rotatably coupled to the bearing sleeve by the bearing assembly.

13. The drivetrain assembly as recited in claim 12 wherein, the transmission is a continuously variable transmission having a drive pulley, a driven pulley and a drive belt looped around the drive pulley and the driven pulley to transfer torque from the drive pulley to the driven pulley.

14. The drivetrain assembly as recited in claim 13 wherein, the driven shaft is coupled to and configured to receive torque from the driven pulley of the continuously variable transmission.

15. The drivetrain assembly as recited in claim 12 wherein, the drive assembly is a reduction drive assembly configured to be shifted between forward and reverse operations.

16. The drivetrain assembly as recited in claim 12 further comprising a vibration damper positioned within a vibration damper aperture of the engine mount.

17. The drivetrain assembly as recited in claim 16 wherein, the engine mount connection of the bearing hub is resiliently coupled to the engine mount by the vibration damper to reduce vibration transfer from the engine to the bearing hub.

18. A snowmobile comprising:

a chassis including a tunnel;

a powertrain coupled to the chassis, the powertrain including an engine and a drivetrain, the drivetrain including a transmission coupled to the engine, a driven shaft coupled to the transmission and a drive assembly coupled to the driven shaft;

a heat exchanger coupled to the tunnel and positioned aft of the engine;

a drive track system disposed at least partially below the tunnel, the drive track system including a track driveshaft coupled to the drive assembly, a track drive sprocket coupled to the track driveshaft and a drive track coupled to the track drive sprocket and configured to provide ground propulsion for the snowmobile;

an engine mount coupled to the engine;

a bearing hub having a body and a bearing sleeve coupled to the body, the body including an upper connection rigidly coupled to the chassis, an aft connection rigidly coupled to the chassis, a lower connection rigidly coupled to the heat exchanger and an engine mount connection resiliently coupled to the engine mount, the bearing sleeve defining a bearing aperture; and a bearing assembly disposed within the bearing aperture;

wherein, the upper connection, the aft connection and the lower connection form a triangular support arrangement for the driven shaft; and wherein, the driven shaft is rotatably coupled to the bearing sleeve by the bearing assembly.

19. The snowmobile as recited in claim 18 wherein, the chassis includes a forward frame assembly and a plate member coupled to the forward frame assembly;

wherein, the heat exchanger includes an end cap; and wherein, the upper connection of the bearing hub is rigidly coupled to the forward frame assembly, the aft connection of the bearing hub is rigidly coupled to the plate member and the lower connection of the bearing hub is rigidly coupled to the end cap of the heat exchanger.

20. The snowmobile as recited in claim 18 further comprising a vibration damper positioned within a vibration damper aperture of the engine mount; and wherein, the engine mount connection of the bearing hub is resiliently coupled to the engine mount by the vibration damper to reduce vibration transfer from the engine to the bearing hub.

* * * * *